United States Patent
Slaughter et al.

(10) Patent No.: US 12,101,417 B1
(45) Date of Patent: Sep. 24, 2024

(54) INTERFACE AND MANAGER FOR MULTIPLE CERTIFICATE AUTHORITIES

(71) Applicant: Amazon Technologies, Inc., Seattle, WA (US)

(72) Inventors: Michael S Slaughter, Seattle, WA (US); Marcel Andrew Levy, Seattle, WA (US); Trevoli Ponds-White, Seattle, WA (US); Derek Bronson, Everett, WA (US); Jonathan Kozolchyk, Seattle, WA (US); Georgy Sebastian, Shoreline, WA (US); Brandonn Gorman, Seattle, WA (US); Graeme David Baer, Bellevue, WA (US); Israel Galvez, Seattle, WA (US); Kenneth Lawler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 695 days.

(21) Appl. No.: 16/827,563

(22) Filed: Mar. 23, 2020

(51) Int. Cl.
*H04L 29/06* (2006.01)
*H04L 9/32* (2006.01)
(Continued)

(52) U.S. Cl.
CPC ............ *H04L 9/3268* (2013.01); *H04L 9/321* (2013.01); *H04L 9/3247* (2013.01);
(Continued)

(58) Field of Classification Search
CPC ... H04L 9/3268; H04L 9/3247; H04L 9/3265; H04L 63/105; H04L 9/321; H04L 61/1511
See application file for complete search history.

(56) References Cited

U.S. PATENT DOCUMENTS

| | | | |
|---|---|---|---|
| 7,937,583 B2 | 5/2011 | Thornton et al. | |
| 2005/0076205 A1* | 4/2005 | Thornton | ............... H04L 63/20 715/741 |

(Continued)

OTHER PUBLICATIONS

Unknown, "The Ability to Manage the Issuance, Lifecycle, and Reporting of PKI is critical", (https://pkisolutions.com), dated Mar. 18, 2020, pp. 1-4.

(Continued)

*Primary Examiner* — Harunur Rashid
(74) *Attorney, Agent, or Firm* — Robert C. Kowert; Kowert, Hood, Munyon, Rankin & Goetzel, P.C.

(57) ABSTRACT

An interface of a certificate management system acts as a target for management of digital authentication certificates from a group of candidate certificate authorities. Entities make certificate signing requests on behalf of subjects. The requests are received at an interface that appears to the requesting entities as a sole source of the signed certificates. But a certificate management component that processes the requests received by the interface applies a selection technique to select a particular certificate authority from a group of candidate certificate authorities available to sign the certificates. The certificate management component forwards the request to the particular certificate authority, receives back the signed certificate, and responds to the certificate signing request with the signed certificate. Although the certificate signing requests were all made via a same interface, the signed certificates can have different chains of trust. Various criteria may be used for the selection.

18 Claims, 8 Drawing Sheets

(51) Int. Cl.
*H04L 9/40* (2022.01)
*H04L 61/4511* (2022.01)

(52) U.S. Cl.
CPC ........ *H04L 9/3265* (2013.01); *H04L 61/4511* (2022.05); *H04L 63/105* (2013.01)

(56) References Cited

U.S. PATENT DOCUMENTS

| | | | |
|---|---|---|---|
| 2005/0091484 A1* | 4/2005 | Thornton | H04L 63/0823 713/156 |
| 2011/0154024 A1* | 6/2011 | Ignaci | H04L 63/0823 713/156 |
| 2012/0054487 A1* | 3/2012 | Sun | H04L 9/3268 713/158 |
| 2013/0086377 A1* | 4/2013 | Cilfone | H04L 9/085 713/156 |
| 2013/0086642 A1* | 4/2013 | Resch | H04L 9/321 726/4 |
| 2014/0181506 A1* | 6/2014 | Resch | H04L 63/0823 713/156 |
| 2015/0372824 A1* | 12/2015 | Himawan | H04L 63/0823 713/156 |
| 2018/0062855 A1* | 3/2018 | Bracken | H04L 63/06 |
| 2018/0139061 A1* | 5/2018 | Glisson | H04L 9/321 |

OTHER PUBLICATIONS

Unknown, "Why You Need More than Certificate Authority Management Solutions", dated Mar. 18, 2020, pp. 1-6.

\* cited by examiner

INTERFACE AND MANAGER FOR MULTIPLE CERTIFICATE AUTHORITIES

BACKGROUND

Certificate authorities (CAs) issue digital certificates. A digital certificate certifies the ownership of a public key by the named subject of the certificate. This allows others (relying parties) to rely upon signatures or on assertions made about the private key that corresponds to the certified public key. A CA acts as a trusted third party-trusted both by the subject (owner) of the certificate and by the party relying upon the certificate. One particularly common use for certificate authorities is to sign certificates used in HTTPS, the secure browsing protocols for the World Wide Web (or to use in SSL, TLS, etc.). An example certificate is an end entity certificate, sometimes installed on servers, machines, cryptographic hardware and devices (e.g. SSL/TLS issued to servers, code signing, client certificates issued to individuals for email encryption, digital signing, authentication).

Generally, in an environment of multiple CAs, an entity selects a particular CA and directly sends a certificate signing request (made on behalf of a subject of the certificate) to that particular CA to be signed. Different CAs may produce certificates having varying characteristics. For an entity that desires a certificate associated with particular characteristic (e.g., associated with a particular type of validation) the requesting entity must identify the particular CA that provides certificates with that particular characteristic, and send a certificate signing request directly to that particular CA, putting administrative strain on the entity to perform the identification and selection. Also, certificate signing request loads may vary abruptly (e.g., based on customer transitions from one CA to another, based on technical updates to systems, due to system failures, due to expirations, etc.). The abrupt changes can be risky, especially in high-volume request systems.

Entities that make certificate signing requests have a known relationship with the particular certificate authority that provides the signed certificate (e.g., the entity needs to know the relationship to issue revocations, to select the right CA associated with particular validation types).

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for an interface and manager for multiple certificate authorities is disclosed. Certificate authorities (CAs) issue digital certificates that certify ownership of a public key by the named subject of the certificate. Certificates have a number of users and uses, including consumers and businesses that utilize the security applications of Public Key Infrastructure (PKI) a technology that enables secure e-commerce and network-based communication. A public key certificate, also known as a digital certificate or identity certificate, is an electronic document used to prove the ownership of a public key.

Generally, an entity such as an administrator or client sends a certificate signing request to a CA to obtain a signed certificate for or on behalf of a subject, such as a domain. The request may include a public key associated with the subject domain. The signed certificate that is returned includes information about the key, information about the identity of its owner (called the subject), and the digital signature of an entity that has verified the certificate's contents (called the issuer). If the signature is valid, and the software examining the certificate trusts the issuer, then it can use that key to communicate securely with the certificate's subject.

One Interface, Multiple Certificate Authorities

Figure 1:
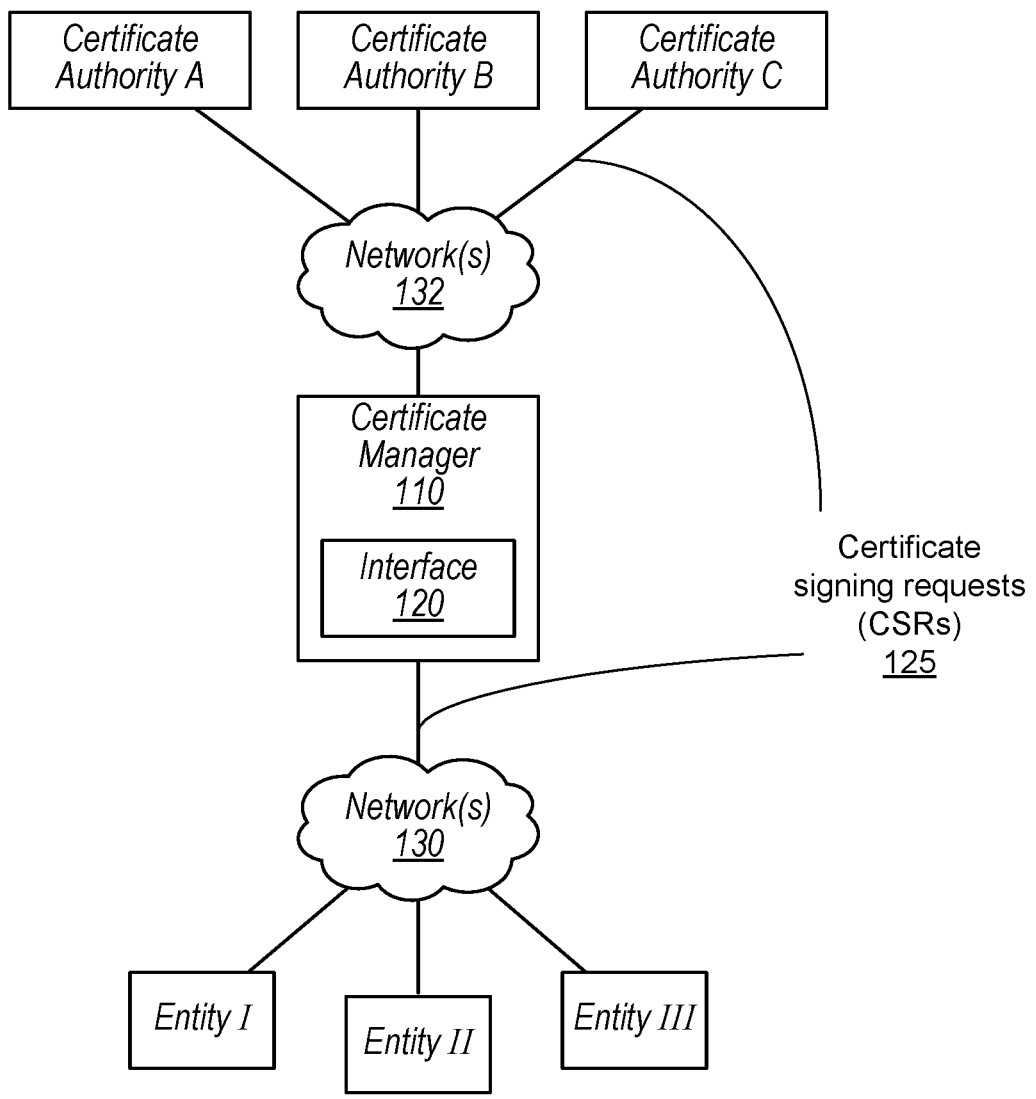
FIG. 1 illustrates a system architecture in which an interface and manager for multiple certificate authorities is implemented, according to some embodiments.

Disclosed is an interface and certificate manager that, in embodiments, appears to entities that make certificate signing request to be a single source of signed certificates as all requests are sent to the interface. But a certificate manager that processes the requests received by the interface applies a selection technique and distributes the requests to various different CAs (candidate CAs), in embodiments. The certificate manager receives back the signed certificates and transfers the signed certificates to the entity that made the request for that signed certificate, in embodiments. Such an architecture has the appearance to requesting entities of a being a single source of signed certificates, but actually sources the signed certificates from any number of different CAs. The certificates returned to the requesting entities look much the same as one another (look like they are from a same single CA, except for exhibiting different chains of trust) in embodiments. The architecture (an example of which is illustrated in FIG. 1, described below) has a number of different uses. For example, these and similar architectures allow a service provider that provides the certificate signing service to gradually switch from one CA to another over time, or to load balance among a number of CAs, or to respond to network outages affecting one or more of the CAs, etc.

Entities (e.g., customers of a service provider or of the certificate management system) that request a publicly trusted certificate from the certificate manager submit, via the interface as part of the request, a list of domains to include in the final certificate and a particular method for domain validation, in embodiments. In embodiments, the certificate manager 1) generates a Public/Private key pair associated with the certificate requester and 2) generates a Certificate Signing Request (CSR) that contains the requested list of domain names (as the Common Name and Subject Alternative Names) and the generated public key.

Root Certificates/Chain of Trust

Generally, each entity is signed by the one above it in the hierarchy to create a chain of trust. The root CA is self-signed and signs all subordinate CAs immediately below it. These in turn sign the entities below them, either additional subordinate CAs or the ultimate end entity certificates. In some embodiments described herein, the candidate CAs that are selected from by the certificate manager may all be subordinate to the same root CA. For example, some systems may implement separate subordinate CAs for different regions or separate subordinate CAs for certificates with ECC keys and one for RSA keys. Subordinate CAs that have the same root CA may create signed certificates having a different chain of trust than other subordinate CAs that have the same root CA. The certificates issued by the certificate management system will share a common PKI root hierarchy, in embodiments. In embodiments, the certificates issued via the certificate management system 110 will chain to a same trust store (e.g., a trust store in a browser, etc.).

CA Selection Techniques

When the certificate manager receives a request via the interface, the manager applies a selection technique or algorithm to select from among a number of candidate CAs (e.g., illustrated in FIG. 2, described below). Any of various types of selection logic may be applied. For example, load balancing techniques such as round-robin or least connections may be applied during the selection. Other possible techniques include weighted least connections, source IP hash, URL hash, least response time, least bandwidth, traffic over time, and the least packets, random, and the custom load method, etc., for example.

Another example, characteristics of the request may be used to make the selection. For example, validation-based selection (illustrated in FIG. 4, described below) selects from the group of candidate CAs based on a type of validation that is specified in the request (e.g., domain, organization or extended validation, etc.). Another example of a characteristic of the request includes a challenge type for a validation process, the challenge type comprising email, DNS or HTTP-based challenges, in embodiments.

In embodiments, functions a certificate authority provides for validation methods that the certificate manager supports: e.g., EMAIL and DNS.

Random Value Generation

For DNS Validation, the certificate manager requests a random value from the CA and inserts it into a Route 53 hosted zone that is fully controlled by the certificate manager system. The certificate manager customer (e.g., a requesting entity) is instructed to insert a customer-specific CNAME record into the DNS of the domain they wish to validate where the VALUE of that CNAME points to a TXT record in the certificate manager controlled hosted that contains the random value.

For EMAIL Validation, the certificate manager requests that the CA sends e-mails to the well-known domain e-mail addresses (admin@, webmaster@, postmaster@, administrator@, hostmaster@) and WHOIS contacts for that targeted domain that contains the Random Value.

Random Value Verification

For DNS Validation, the certificate managers workflow periodically verifies that the random value was successfully inserted into the customer's DNS and upon success, the certificate manager submits a request for the CA to perform a public DNS lookup to find that random value and complete domain validation, in embodiments.

For Email Validation, the emails sent by the CA to the domain e-mail addresses contain the random value generated by the CA and a link to a website controlled by the certificate manager. On this website, the customer can perform an action that triggers the certificate manager to submit the random value back to the CA to complete domain validation, in embodiments.

In embodiments, the certificate manager is responsible for managing the overall validation workflow for the requesting entity, accounting for timeouts, state transitions and customer communications. Additionally, in some embodiments, for DNS validation the certificate manager may abstract away the random token management aspects of the domain validation process by providing customers a unique record instead. This unique record allows the certificate manager to perform DNS domain validation for that customer with any CA without any additional action or configuration changes required by the customer In embodiments, characteristics of the network may be used in selection of a particular CA from the group of candidate CAs. For example, the health of the network, availability of a particular CA on a particular network, network load being applied to a CA, and the like may be used in the selection.

Characteristics of the CAs may be used in selection from the group of candidate CAs. For example, some CAs may specialize in generation of particular types of certificates or provide specialized services with regard to certificate signing requests, such as particular type of validation (e.g., domain, organization or extended, etc.). Other characteristics of the CA such as availability, or a current load level being experienced at the CA may be used in the selection, in embodiments.

Selection techniques may be use-case based, in embodiments. For example, for a system that is phasing out a particular CA and transitioning to a new CA, the selection technique may initially assign a small percentage of the requests to the new CA (e.g., to avoid any possible failures from affecting a large number of the request) and assign a large percent of the requests to the CA being phased out (e.g., because that CA is known to work well). Over time, the certificate manager may ramp up the percentage of requests assigned to the new CA and ramp down the number of requests assigned to the CA being phased out. A similar transition technique may be applied in other circumstances, such as when a CA associated with an expiring certificate (root or subordinate) is being replaced with a new CA. The certificate manager may begin a relatively-longer transition process similar to that above before the expiration period to avoid the large risk of an abrupt change at expiration. In another example, a service provider may desire to transition from an external CA to an internal CA. A similar smooth-transition selection technique over time may be applied here as well.

Selection may be based on other criterion such as the availability of a CA, based on having a fallback CA (e.g., when a CA fails or when a network supporting a CA fails), or based on other operational reasons (e.g., where it makes sense to maintain multiple CAs over longer durations of time).

Figure 3:
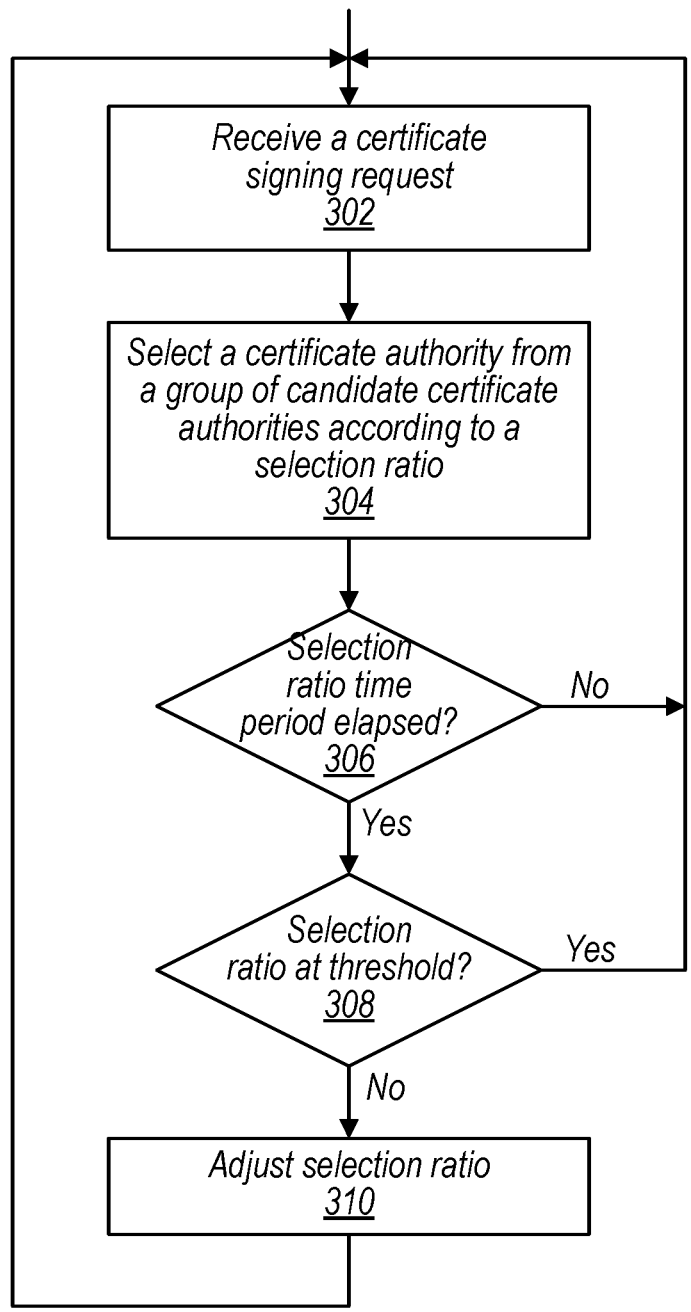
FIG. 3 illustrates a flowchart for adjusting a processing ratio associated with processing certificate signing requests, according to some embodiments.

At least some selection techniques may mix and match from the above selection criteria and/or characteristics, in embodiments, and may dynamically adapt by changing among the various above-noted selection criteria and/or characteristics, in embodiments. For example, a selection technique may initially (e.g., for a configurable duration of time or for some number of certificates signing requests) select from among the candidate CAs according to a ratio (e.g., select certificate authority A three times for every two times certificate authority B is selected). A similar technique is illustrated in FIG. 3, described below. After the time duration or set number of selections, the certificate manager may modify the selection ratio or may make a selection based on other or additional criteria. For example, if a load of the requests being sent to certificate authority A reaches some threshold, the certificate manager may start sending particular types of requests to another CA (e.g., start sending domain-validation type requests to certificate authority C that specializes in that type of validation).

In at least some embodiments, the certificate manager may perform other functionality beyond those associated with receiving and distributing certificate signing requests. For example, the certificate manager may be involved in certificate revocations (illustrated in FIG. 5, described below). In another example, the certificate manager may be involved in validation functionality, distributing requests according to a type of validation specified in the request.

The following description of the figures begins with a description of a certificate manager and interface that present a single-source for numerous distinct entities to make certificate signing requests, but distribute the request among a group of candidate CAs. The description of the figures then presents an example process implemented by the certificate manager and interface to process the requests, with various examples of particular selection techniques, followed by an example revocation process also implemented by the certificate manager. The description then provides examples of various system architectures that implement the process and selection techniques.

It is contemplated that the illustrated systems in FIGS. 1 and 6-8 may include more or fewer components than illustrated, in embodiments, and in at least some embodiments some components may perform different parts of the variously-disclosed functionality. Similarly, the methods illustrated in FIGS. 2-5 are examples, and the illustrated systems may perform various functionality disclosed in the methods in different sequences or may perform additional or fewer steps, in embodiments.

FIG. 1 illustrates a system architecture in which an interface and manager for multiple certificate authorities is implemented (e.g., a multi-tenant system for subordinate CAs), according to some embodiments. The certificate manager 110 in FIG. 1, in some embodiments, similar to the certificate manager 110 in FIGS. 6, 7 and 8 may perform the processes and techniques illustrated in and described for FIGS. 2-5, in embodiments.

As explained above, a certificate manager may perform any of various functionality including acting as a single target or source for entities (e.g., entities I-III) to make certificate signing requests (CSRs), received via interface 120, for example. Certificate manager 110 may select, based on some criteria, a particular certificate authority (e.g., CA A-C in FIG. 1) to forward the CSR, receive back a signed certificate and forward the signed certificate to the requesting entity (e.g., the entity of entities I-III that made the CSR). In embodiments, this makes the certificate manager 110 appear to requesting entities as a single CSR, but actually distributes the requests to a number of various CSRs.

Interface 120 may be implemented variously (e.g., via various combinations of program code that implement application program interfaces, graphical user interface components, internet protocol addressing (IP address) and the like, etc.). In one example, interface 120 may be associated with a particular IP address for entities to send requests, but may distribute the requests across a number of certificate managers 110 (e.g., for a provider system that implements numerous regional certificate managers 110).

Entities I-III in FIG. 1 may include any entity (e.g., an administrator, client, user, a subject itself, or the like) that makes certificate signing requests for or on behalf of a subject (e.g., for a domain or server, where the certificate will be stored and used, etc.) specified in the request via a network 130 (public or private networks or combinations thereof), in embodiments. Generally, entities engage with the interface 120 to generate or transmit certificate signing requests (e.g., requests that specify a public key and other information or metadata associated with the request) to the certificate manager. Entities I-III may engage in other activities with the certificate manager 110 via interface 120, such as notifying the certificate manager of a revocation of a certificate or the like.

Generally, certificate manager 110 processes the certificate signing requests by applying some selection technique or algorithm (from basic or more complex, in embodiments) in order to select a particular certificate authority (CA) from two or more candidate certificate authorities (CAs), from candidate CAs A, B, and C, in FIG. 1, for example. The candidate CAs may be homogenous (all regional CAs of a service provider) or diverse (a mix of public, private, internal-to-network, external-to-network, of various validation types, etc.). The certificate manager forwards the certificate signing request to the selected CA (e.g., via a network 132). Network 132 may be an internal network of a service provider, a public network, or some combination thereof, in embodiments.

In some embodiments, the certificate acts as a sole target (or source) of requests, but implements a selection technique that guarantees some sort of alternation among or between a fleet of subordinate CAs.

For example, substantially similar requests (e.g., requests from a same entity, and/or requests requesting a same type of validation, etc.) may be processed by a selection technique that guarantees processing for at least some of the substantially similar requests by different CAs.

In embodiments, the selection technique may include selecting a particular CA from the group of candidate CAs based on criteria other than the type of validation for the CSR.

Figure 2:
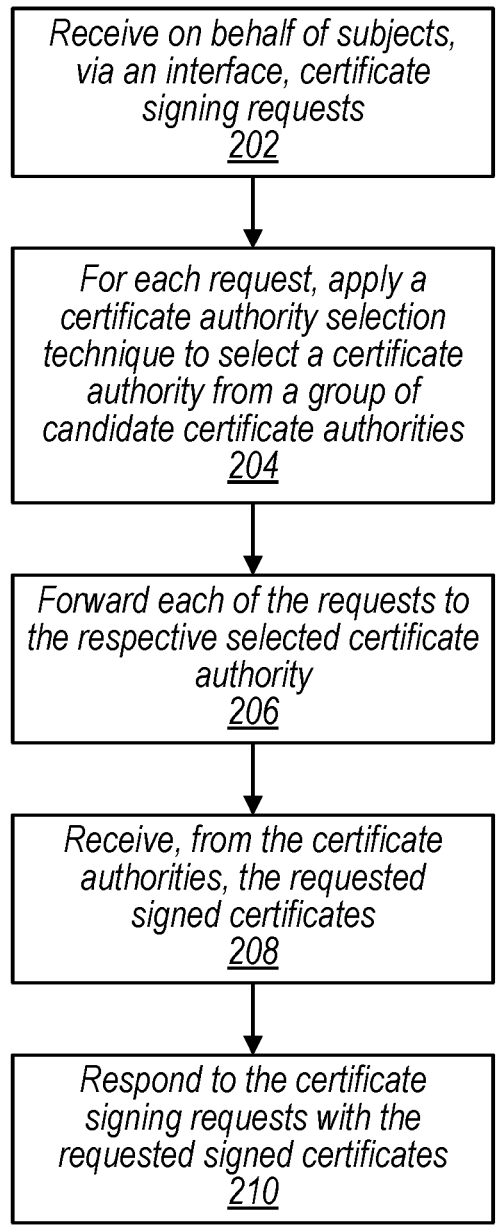
FIG. 2 illustrates a flowchart for processing, by an interface and manager for multiple certificate authorities, certificate signing requests, according to some embodiments.

FIG. 2 illustrates a flowchart for processing certificate signing requests implemented by an interface and manager for multiple certificate authorities, according to some embodiments. The process illustrated in FIG. 2 may be performed by components illustrated in FIGS. 1 and 6-8, in embodiments, by the certificate manager 110 and interface 120, for example.

Figure 4:
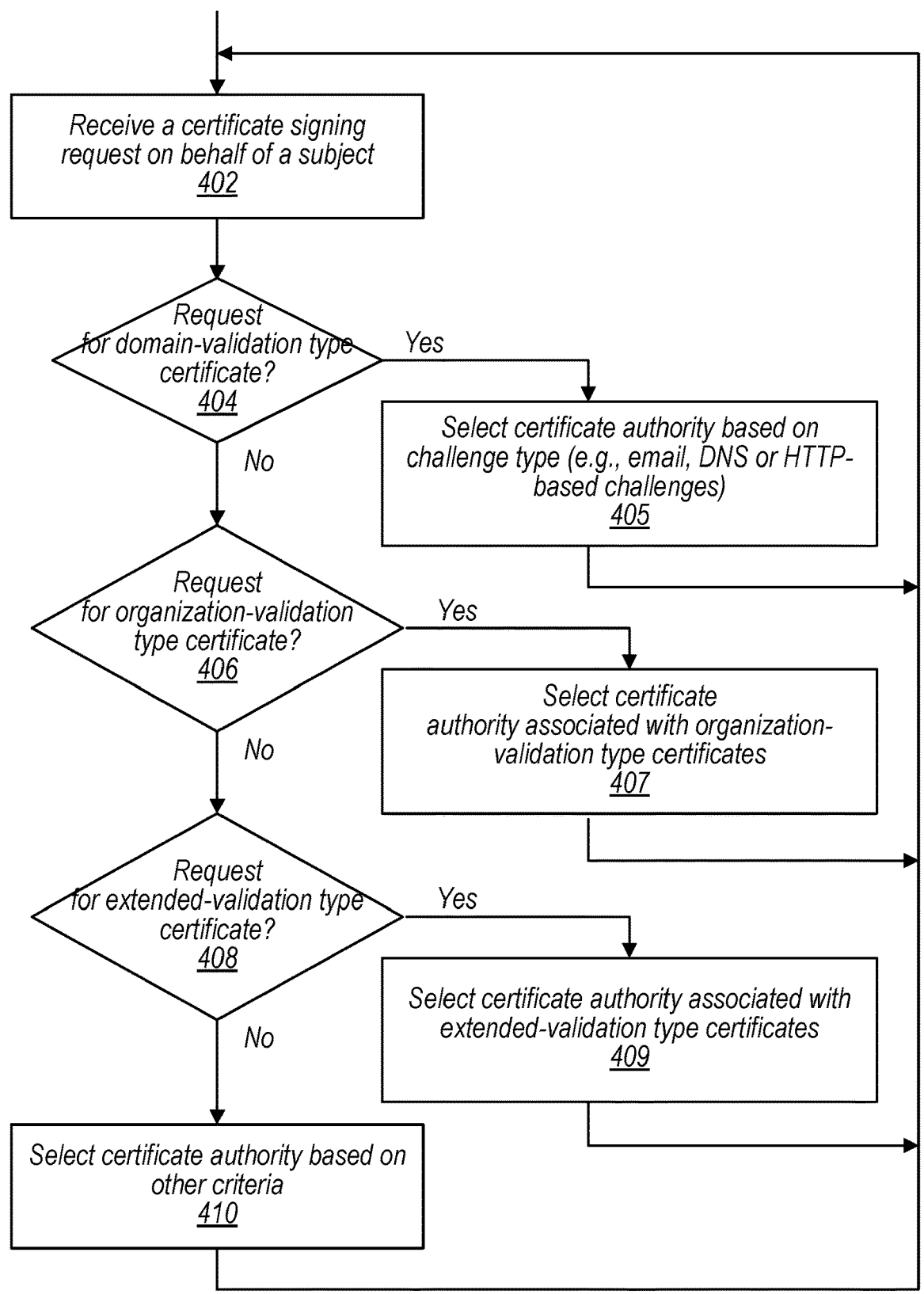
FIG. 4 illustrates a flowchart for selecting a certificate authority from a group of candidate certificate authorities, according to some embodiments.

Certificate signing requests are received on behalf of subjects, via an interface (block 202). For example, FIG. 1 illustrates certificate signing requests 125 being sent from entities I-III to certificate manager 110 via interface 120. For each request a certificate authority selection technique is applied to select a particular certificate authority from among a group of candidate certificate authorities (block 204). For instance, certificate manager 110 in FIG. 1 may apply a selection technique (examples are illustrated in FIGS. 3 and 4, described below) to determine to which particular one of certificate authorities A-C to distribute the CSRs. Each of the requests are forwarded to the respective selected certificate authority (block 206). For example, certificate manager 110 distributes the respective certificate signing requests (CSRs) to particular ones of CAs A-C in FIG. 1.

In at least some embodiments, the certificate manager applies a selection technique that guarantees that at least some substantially similar requests will be distributed for process to different CAs. For example, if a same CSR were received twice, each of those same CSRs could get routed to different CAs, according to the selection technique. In some embodiments, the selection technique may be based solely on information not in the request from the entity and/or not on information in the CSR (e.g., if the CSR is generated by the certificate manager in response to a request from an entity).

The requested signed certificates are received (e.g., by the certificate manager 110) from the certificate authorities (block 208). The certificate manager responds to the certificate signing requests (made in block 202) by transferring the signed certificates (210) to the requesting entity. For example, certificate manager 110 transfers the signed certificates to corresponding entities I-III.

In some embodiments, the certificate signing requests (CSRs) may be generated by the certificate manager. For example, an entity may enter information pertinent to a CSR into a graphical user interface (e.g. interface 120) that uses that data to, or passes that data to the certificate manager to generate a CSR that is distributed to one of the certificate authorities.

FIG. 3 illustrates a flowchart for adjusting a processing ratio (or percentage) associated with processing certificate signing requests implemented by an interface and manager for multiple certificate authorities, according to some embodiments. The illustrated technique may be applied by certificate manager 110 to select a particular CA from among a group of candidate CAs (see block 204), in embodiments. A certificate signing request (CSR) is received (block 302). A certificate authority (CA) is selected from a group of candidate certificate authorities according to a selection ratio (block 304). For example, logic implemented by program instructions may assign a ratio of the CSRs to each of the candidate CAs. Using FIG. 1 as an example, CA A may be assigned to process 2/9 CSRs, CA B assigned to process 4/9 CSRs and CA C assigned to process 3/9 CSRs. The manager may distribute the CSRs to the CAs according to the ratio as batches or individually, in embodiments.

In some embodiments, the ratio may be configurable or even dynamically configurable. For example, an administrator (e.g., service provider admin or client admin) may configure the certificate manager to assign particular ratios or percentages to each of the candidate CAs, the CSRs distributed according to the ratio or percentages. In another example, the certificate manager may be configured to start processing CSRs according to an initial ratio, but then transition over time to a different ratio (e.g., start out with an 80:20 ratio for two CAs and transition to a 50:50 ratio after processing CAs for 10 days, etc.). The certificate manager may be configured to determine whether a selection ratio time period has elapsed (block 306). If not, (block 306, no) the process may return to block 302 and process the next CSR. If the ratio time period has elapsed (306, no) the certificate manager 110 may determine whether a selection ratio threshold has been reached (block 308). For example, a particular use case may call for gradually transitioning one CA (e.g., CA A) out of service while gradually transitioning another CA (e.g., CA B) into service as a replacement. One way to perform the transition is to begin processing CSRs at a ratio of 9:1 (CA A:CA B) and then adjust the ratio over time until the desired threshold ratio (0:10 in this example) is achieved. If a target selection ratio (or a max or min threshold in other examples) has not been reached (block 308, no) the selection ratio is adjusted (block 310). If the target (or max or min., etc.) selection ratio has been reached (block 308, yes) the process may return to block 302 and receive the next CSR to process. The example ratios provided are examples and are not exhaustive examples. Any other ratios are contemplated without departing from the disclosure (e.g., 90:10, 80:20 . . . 25:75, 3:97, etc.)

FIG. 4 illustrates a flowchart for selecting a certificate authority from a group of candidate certificate authorities, according to some embodiments. The illustrated process may be performed by certificate manager 110, in embodiments.

A certificate signing request (CSR) is received on behalf of a subject (block 402. For example, an entity (e.g., an admin or client) may enter various data (e.g., the subject, the public key, a validation type, etc.) into fields of a graphical user interface 120 that generates the request based on the fields and provides the request to certificate manager 110.

The technique includes determining whether the request indicates a domain-validation type certificate is being requested (block 404), Of so, (block 404, yes) a certificate authority that performs domain-validation is selected from the candidate group of CAs. In the illustrated embodiment, a certificate authority that performs a challenge type (e.g., email, DNS or HTTP-based challenges) indicated in the request is selected (block 405) to process the request and generate the signed certificate, subsequent to performed the corresponding validation.

If the request does not include a domain-validation type certificate (block 404, no) a determination may be made whether the request is for an organization-validation type certificate (block 406). If so, (block 406, yes) a certificate authority that performs organization-validation is selected from the candidate group of CAs (block 407). If the request does not include an organization-validation type certificate (block 406, no) a determination may be made whether the request is for an extended-validation type certificate (block 408). If so, (block 408, yes) a certificate authority that performs extended-validation is selected from the candidate group of CAs (block 409). Otherwise (e.g., if a particular type of validation is not specified, or if none of the corresponding CAs are available, the technique may include selecting a CA based on other criteria (block 410) via round-robin, or least connections, or based characteristics of the request, characteristics of the network or characteristics of the CAs, for example). In any of the cases, once a CA has been selected, the process may return to block 402, receiving another CSR and processing is accordingly.

Figure 5:
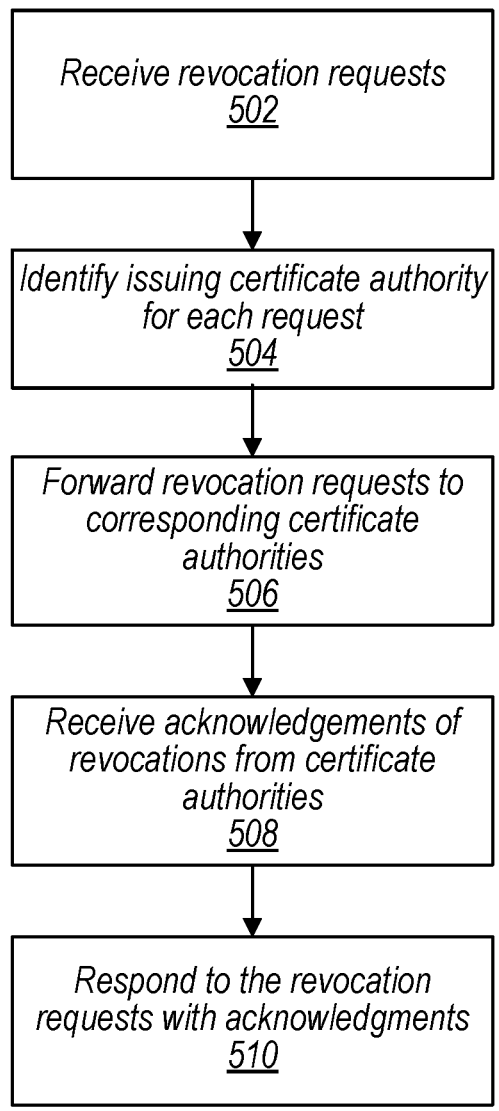
FIG. 5 illustrates a flowchart for revocation of certificates, according to some embodiments.

FIG. 5 illustrates a flowchart for revocation of certificates, according to some embodiments. The illustrated process may be performed by certificate manager 110, in embodiments. FIG. 5 illustrates that revocation requests are received (block 502), and the issuing certificate authority (CA) is identified for each request (block 504). For example, the revocation request may include the revoked certificate (which contains a serial number and the issuer)—thereby identifying the issuing CA, or may include certificate metadata (which has all of the metadata required to do the mapping) in the request. In embodiments, the certificate manager 110 may have stored information associating the certificate with a particular CA at the time the signed certificate was obtained from the issuing CA.

The revocation requests are forwarded to the corresponding CA (block 506) and acknowledgement of the revocation may be received from the certificate authority (block 508). The certificate manager transfers the acknowledgement to the entity from which the revocation request was received (block 510).

In at least some embodiments, a certificate manager may send out new signed certificates ahead of expiration of an existing certificate. For example, the certificate manager may determine that an expiration is approaching, create a CSR with the appropriate subject etc., and send the CSR to a CA for signing. The certificate manager may distribute the CSR to the CA that signed the expiring certificate or apply a selection technique (as described herein) to select another CA to process the CSR, in embodiments.

Figure 6:
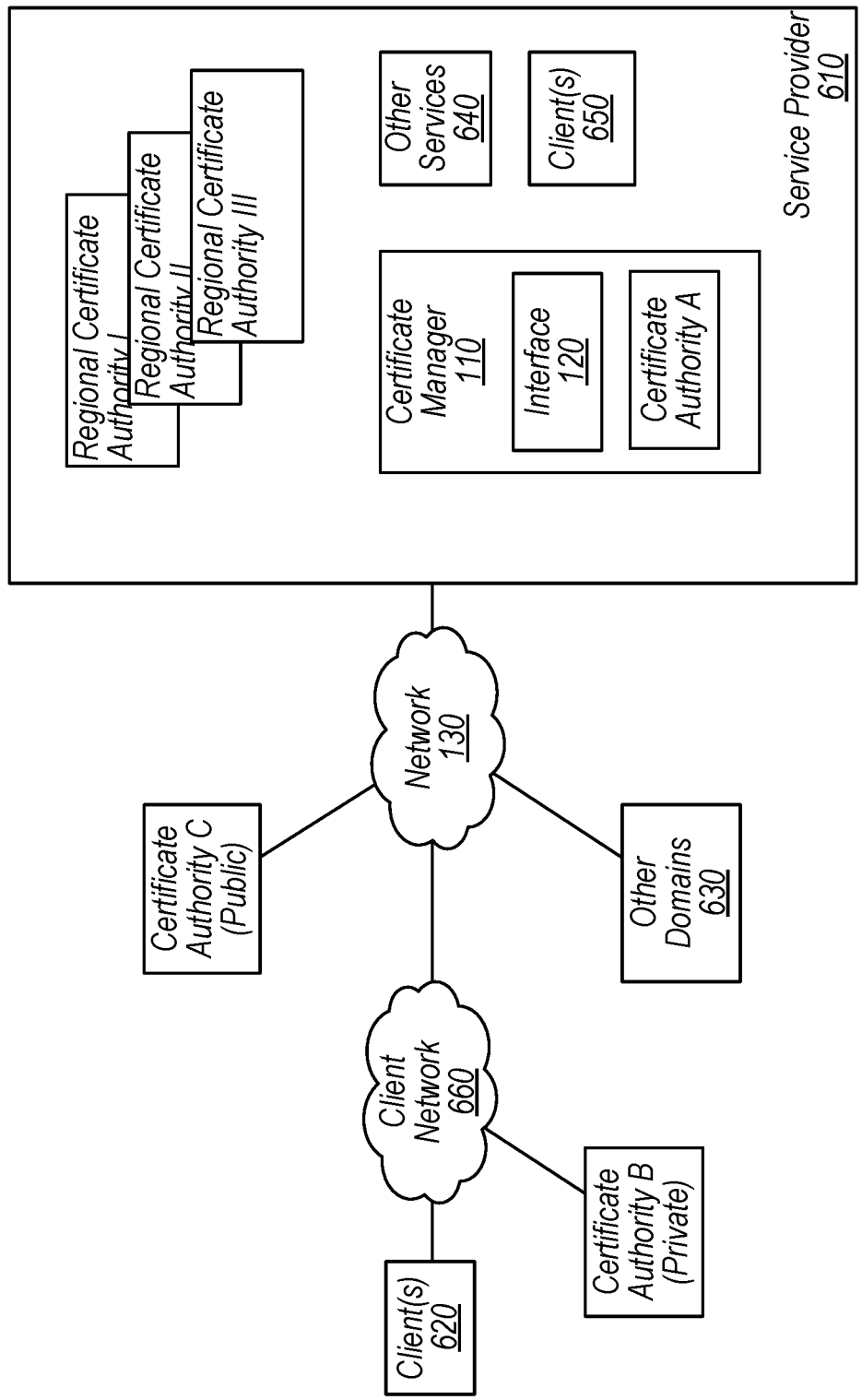
FIG. 6 illustrates a service provider network that provides an interface and manager for processing certificate signing request, according to embodiments.

FIG. 6 illustrates a service provider network that provides an interface and manager for multiple certificate authorities, according to embodiments. In the illustrated embodiment, a multi-tenant service provider 610 makes a certificate manager 110 with interface 110 and internal certificate authority A available to internal client(s) 650, other services 640 (e.g., internal services or processes of a service provider running on behalf of a client or otherwise), as well as to other entities such as external client(s) 620 (or external processes, or the like) on various external client network(s) 660 or to other domains 630, such as other service providers or other various public or private entities. The entities may make requests, such as certificate signing requests via interface 120 to certificate manager 110 that processes the requests by distributing the requests among a group of candidate certificate authorities (A-C, regional certificate authorities I-III). In some embodiments, the group of candidate certificate authorities (certificate authorities A-C and regional certificate authorities I-III) are subordinate certificate authorities to a common root certificate, and are all configured to issue certificates. In various embodiments, certificate authorities A-C and regional certificate authorities I-III may issue certificates that present different chains of trust, but the chains of trust may all end back at the same root.

In one example use case illustrated in in FIG. 6, service provider 610 may rely upon an external certificate authority (CA) illustrated as certificate authority C (public) in FIG. 6. The service provider may desire to transition from reliance on the external CA C to an internal certificate authority A. To facilitate a smooth (instead of abrupt) transition, a certificate manager 110 is configured with an interface 120 that serves as a single target for certificate signing requests (and other related requests and functionality, in embodiments). The certificate manager processes the requests by selecting a particular CA from the group of candidate certificate authorities (e.g., the group including candidate certificate authorities A-C, and regional certificate authorities I-III). The selection technique may include a process that, over time, transitions the requests from being mostly forwarded to the external CA C to being mostly forwarded to the internal CA A.

In other use cases, the certificate manager 110 may implement logic that dynamically moves certificate signing request load among candidate certificate authorities A-C, and regional certificate authorities I-III, in response to changes in network characteristics, in response to changes in load among the CAs, or based on other criteria.

Figure 7:
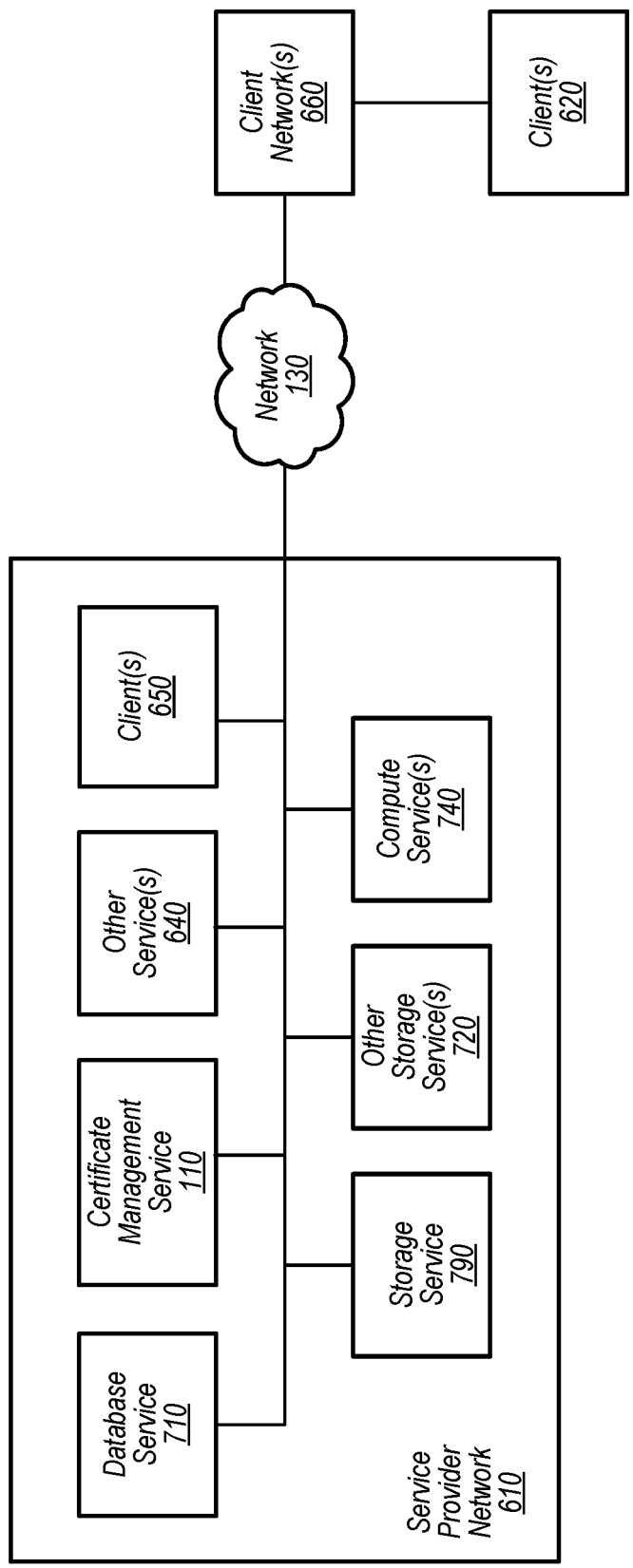
FIG. 7 illustrates a service provider network that provides an interface and manager as a service for processing certificate signing requests by distributing the requests to multiple certificate authorities, according to embodiments.

FIG. 7 illustrates a service provider network that provides an interface and manager for multiple certificate authorities as a service, according to embodiments. Depicted is a certificate management service 110 similar to those illustrated in FIGS. 1 and 6-8, that may perform some of the steps illustrated in at least FIGS. 2-5. The certificate management service 110 is illustrated as part of service provider network 610 that includes database service 710, storage service 790, compute service 740, clients 650 as well as other storage services 720 and other services 640. In at least the illustrated embodiment, the service provider network 100 is communicatively coupled to client networks 660 and clients 620 via network 130. Service provider network 610 may provide one or more services to a plurality of distinct customers, each distinct customer comprising a distinct customer network. One or more of the components in FIG. 7 may be implemented by one or more of the computing nodes 800 illustrated in FIG. 8.

Example Computer System

Figure 8:
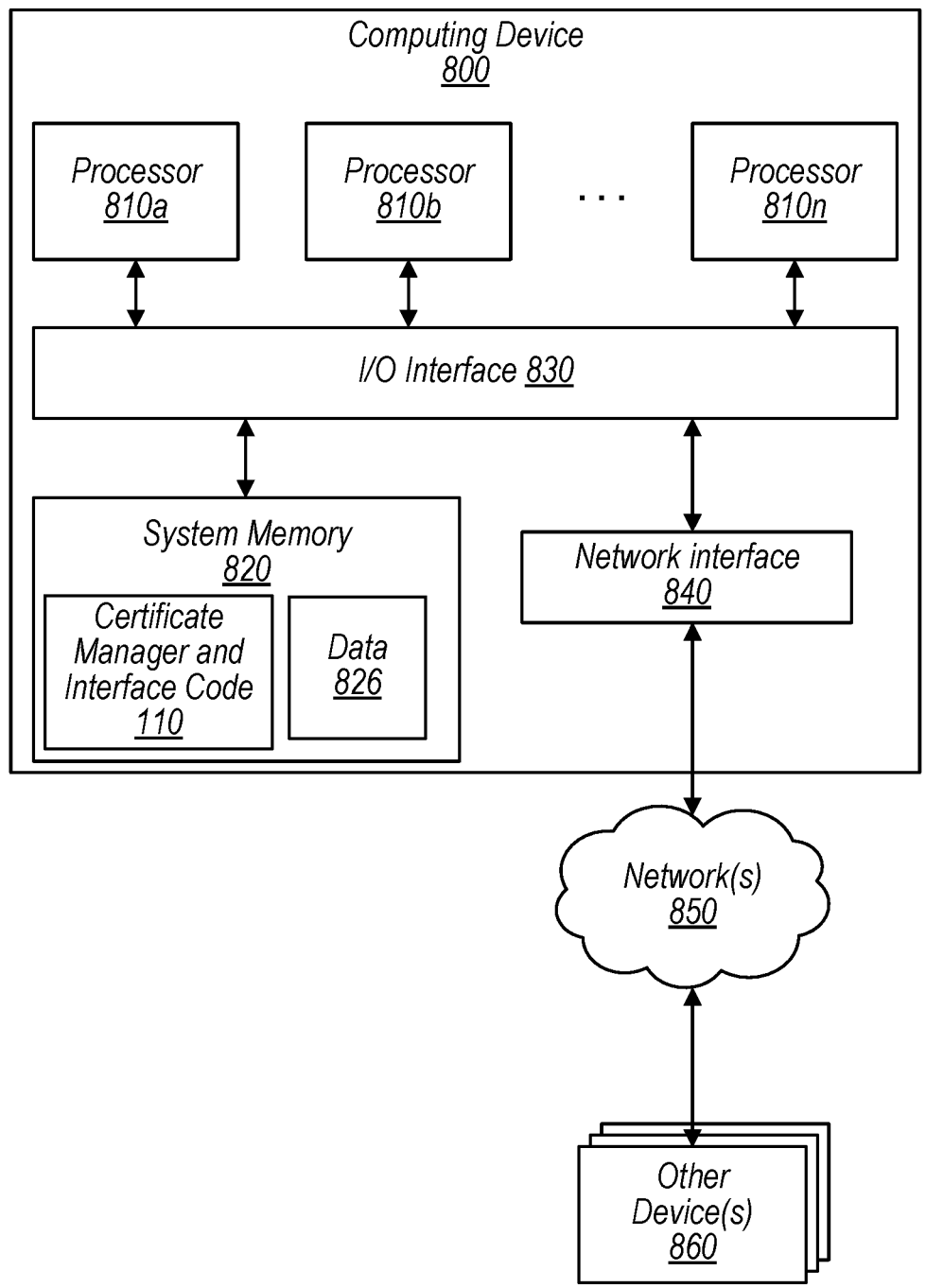
FIG. 8 illustrates an example of a computer system, one or more of which may implement various components described and illustrated throughout the disclosure, including an interface and manager for multiple certificate authorities, according to embodiments.

FIG. 8 illustrates an example of a computer system, one or more of which may implement various components described and illustrated throughout the disclosure, including an interface and certificate manager for providing signed certificates from multiple certificate authorities, according to embodiments.

Various portions of systems in FIGS. 1, and 6-7 and/or methods presented in FIGS. 2-5 described herein, may be executed on one or more computer systems similar to that described herein, which may interact with various other devices of the system.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 860, such as cursor control device, keyboard, audio device, and display(s). In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for load testing may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 820 may be configured to store program instructions and/or data accessible by processor 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a certificate manager system and method, are shown stored within system memory 820 as certificate manager and interface code 825 and data storage 826, respectively. In other embodiments, program instructions and/or data may be received, sent, or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840. Program instructions may include instructions for implementing the techniques described with respect to any of the FIGs.

In some embodiments, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 800 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions (e.g., such as certificate manager and interface code 825), configured to implement embodiments of a certificate manager and interface system and methods as described herein, and data storage 826, comprising various data accessible by the program instructions 825. In one embodiment, program instructions 825 may include software elements of a method illustrated in the above figures. Data storage 826 may include data that may be used in embodiments described herein. In other embodiments, other or different software elements and/or data may be included.

Those skilled in the art will appreciate that computer system 800 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium.

Accordingly, the present invention may be practiced with other computer system configurations. In some embodiments, portions of the techniques described herein (e.g., certificate signing request management) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing nodes comprising one or more processors and memory storing program instructions that implement:
  a certificate manager; and
  a common interface configured to receive certificate signing requests directed to the certificate manager;
  the certificate manager configured to:
    for a first certificate signing request of the certificate signing requests:
      apply a certificate authority selection technique, comprising apply a selection ratio that specifies a ratio at which particular ones of a group of candidate certificate authorities are to be selected, to select a certificate authority from the group of candidate certificate authorities;
      forward the first request to the selected certificate authority;
      receive, from the selected certificate authority, a first signed certificate; and
      respond to the first certificate signing request with the first signed certificate;
    adjust, in accordance with one or more criterion, the selection ratio; and
    for a second certificate signing request of the certificate signing requests:
      apply the certificate authority selection technique to select, in accordance with the adjusted selection ratio another certificate authority from the group of candidate certificate authorities;
      forward the second request to the other selected certificate authority;
      receive, from the other selected certificate authority, a second signed certificate; and
      respond to the second certificate signing request with the second signed certificate.

2. The system of claim 1, wherein, for another plurality of certificate signing requests, application of the certificate authority selection technique comprises:
  selecting the certificate authority from the group of candidate certificate authorities based on data specified in the request, the data comprising:
    a type of validation process, comprising domain validated, organization validated, or extended validation; or
    a challenge type, comprising email, DNS or HTTP.

3. The system of claim 1, wherein the group of candidate certificate authorities
  are subordinate certificate authorities that issue certificates that:
    share a common PKI root hierarchy; or
    chain to a root found in a same trust store.

4. The system of claim 1,
  wherein one or more of the candidate certificate authorities and the certificate manager are hosted by resources of a multi-tenant service provider network that provides clients of the service provider service-based access to the certificate manager via the common interface; and
  wherein the common interface is configured to receive certificate signing requests from clients internal to the provider network and from clients external to the provider network.

5. A computer-implemented method, comprising:
  receiving, via a common certificate signing request interface, a plurality of certificate signing requests;
  for each of the plurality of certificate signing requests:
    applying, by a certificate manager, a certificate authority selection technique, comprising selecting from a group of candidate certificate authorities in accordance with a selection ratio that specifies a ratio at which particular ones of the candidate certificate authorities are to be selected, to select a certificate authority;
    forwarding the certificate signing request to the selected certificate authority;
    receiving, from the certificate authority, a signed certificate; and
    responding to the certificate signing request with the signed certificate;
    wherein at least some of the signed certificates are signed by different ones of the candidate certificate authorities;
  adjusting, in accordance with one or more criterion, the ratio for one or more of the candidate certificate authorities; and
  responsive to another certificate signing request, selecting from the candidate certificate authorities in accordance with the adjusted selection ratio.

6. The computer-implemented method of claim 5,
  wherein, for another plurality of certificate signing requests, said applying the certificate authority selection technique to select a certificate authority comprises:
    determining, from the respective signing request, the type of validation for the requested certificate; and
    selecting the certificate authority based at least in part on the type of validation.

7. The computer-implemented method of claim 5, wherein, for another plurality of certificate signing requests, said applying the certificate authority selection technique to select the certificate authority comprises selecting from the candidate certificate authorities based at least in part on a characteristic of a network.

8. The computer-implemented method of claim 5, wherein, for another plurality of certificate signing requests, said applying the certificate authority selection technique to select the certificate authority comprises selecting from the candidate certificate authorities based at least in part on a characteristic of a certificate authority.

9. The computer-implemented method of claim 5, wherein, for another plurality of certificate signing requests, said applying the certificate authority selection technique to select the certificate authority comprises selecting from the candidate certificate authorities based at least in part on a load balancing technique comprising round-robin, least response time, least bandwidth, traffic over time, and the least packets, or a custom load method.

10. The computer-implemented method of claim 5, comprising:
hosting, by resources of a multi-tenant service provider network that provides clients of the service provider service-based access to a certificate manager that performs said receiving, said applying, said forwarding, said receiving, and said responding.

11. The computer-implemented method of claim 10, further comprising:
hosting, by resources of the multi-tenant service provider, one or more of the candidate certificate authorities.

12. The computer-implemented method of claim 10, wherein said receiving the plurality of certificate signing requests comprises receiving at least some of the certificate signing requests, via the common request interface, from one or more processes internal to the provider network and from one or more processes external to the provider network.

13. The computer-implemented method of claim 5, further comprising:
receiving, via the common interface, a certificate revocation request; and
forwarding the revocation request to the corresponding certificate authority.

14. One or more non-transitory computer-readable media storing program instructions that when executed on or across one or more processors perform:
receiving, via a common request interface, a plurality of certificate signing requests;
for each of the plurality of certificate signing requests:
applying, by a certificate manager, a certificate authority selection technique, comprising selecting from a group of candidate certificate authorities in accordance with a selection ratio that specifies a ratio at which particular ones of the candidate certificate authorities are to be selected, to select a certificate authority;
forwarding the certificate signing request to the selected certificate authority;
receiving, from the certificate authority, a signed certificate; and
responding to the certificate signing request with the signed certificate; and
wherein the certificate manager that performs said applying the certificate authority selection technique to select the certificate authorities performs said receiving the signed certificates and said responding to the certificate signing requests with the signed certificates;
adjusting, in accordance with one or more criterion, the selection ratio for one or more of the candidate certificate authorities; and
responsive to another certificate signing request, selecting from the candidate certificate authorities in accordance with the adjusted selection ratio.

15. The one or more non-transitory computer-readable media of claim 14, wherein, for another plurality of certificate signing requests, to perform said applying the certificate authority selection technique the program instructions perform:
selecting the certificate authority from the group of candidate certificate authorities based on data specified in the request, the data comprising:
a type of validation process comprising domain validated, organization validated, or extended validation; or
a challenge type for a validation process, the challenge type comprising email, DNS or HTTP.

16. The one or more non-transitory computer-readable media of claim 14, wherein, for another plurality of certificate signing requests, to perform said applying the certificate authority selection technique the program instructions perform:
selecting the certificate authority from the group of candidate certificate authorities based on one or more load balancing techniques comprising round-robin, least connections, weighted least connections, least response time, least bandwidth and the least packets, or a custom load method.

17. The one or more non-transitory computer-readable media of claim 14, wherein, for another plurality of certificate signing requests, to perform said applying the certificate authority selection technique the program instructions perform:
selecting the certificate authority from the group of candidate certificate authorities based at least in part on a characteristic of a network.

18. The one or more non-transitory computer-readable media of claim 14, comprising program instructions that when executed on or across one or more processors perform:
receiving, via the common interface, a certificate revocation request; and
forwarding the revocation request to the corresponding certificate authority.

* * * * *